US012623228B2

(12) United States Patent
Verweij

(10) Patent No.: US 12,623,228 B2
(45) Date of Patent: May 12, 2026

(54) ROTOR TIP BLOCK SECURING ARRANGEMENT

(71) Applicant: ORECRUSHER S.A. (PTY) LTD., Benoni (ZA)

(72) Inventor: Roeland Verweij, Benoni (ZA)

(73) Assignee: ORECRUSHER S.A. (PTY) LTD., Benoni (ZA)

( * ) Notice: Subject to any disclaimer, the term of this patent is extended or adjusted under 35 U.S.C. 154(b) by 192 days.

(21) Appl. No.: 18/343,791

(22) Filed: Jun. 29, 2023

(65) Prior Publication Data

US 2025/0001429 A1 Jan. 2, 2025

(51) Int. Cl.
*B02C 13/28* (2006.01)
*B02C 13/18* (2006.01)

(52) U.S. Cl.
CPC .......... *B02C 13/2804* (2013.01); *B02C 13/18* (2013.01); *B02C 2013/2812* (2013.01); *B02C 2210/02* (2013.01)

(58) Field of Classification Search
CPC . B02C 13/2804; B02C 13/18; B02C 13/1885; B02C 2013/2812; B02C 2210/02
See application file for complete search history.

(56) References Cited

U.S. PATENT DOCUMENTS

2009/0014569 A1* 1/2009 Rodriguez .......... B02C 13/2804 241/286
2015/0048191 A1* 2/2015 Clint .................. B02C 13/2804 241/300
2018/0297034 A1* 10/2018 Grosch ................. B02C 13/282

* cited by examiner

*Primary Examiner* — Mohammed S. Alawadi
(74) *Attorney, Agent, or Firm* — Sheppard Mullin Richter & Hampton LLP

(57) ABSTRACT

A rotor protection plate for mounting on an upper plate of a rotor body of a crusher, in particular a vertical shaft impact crusher, is provided. The rotor protection plate comprises a body having an inner face defining a guide slot that is operably arranged to be in register with a rotor tip block opening defined on the upper plate of the rotor body and spaced apart therefrom to allow for a rotor tip block to be partly inserted into the guide slot during removal of the rotor tip block from, or insertion of the rotor tip block into, the rotor body.

5 Claims, 6 Drawing Sheets

ROTOR TIP BLOCK SECURING ARRANGEMENT

FIELD OF INVENTION

THIS INVENTION is in the field of impact crushers, and in particular vertical shaft impact (VSI) crushers. More in particular, this invention relates to a rotor assembly for a VSI impact crusher, and in particular to a rotor tip block securing arrangement for securing rotor tip blocks to the rotor assembly.

BACKGROUND OF INVENTION

VSI crushers find widespread use for crushing a variety of hard materials, such as rock, ore, demolished constructional materials and the like. Typically, a VSI crusher comprises a housing that accommodates a horizontally aligned rotor rotatably mounted on a generally vertically extending main shaft. The rotor is provided with a top aperture through which material to be crushed is fed under gravity from an elevated position. The VSI is an autogenous or semi autogenous impact crusher i.e. the crushing action takes place when the ejected material impacts the build-up of the crushed feed product.

The rotor commonly comprises a horizontal upper ring, which defines the top aperture, and a horizontal lower disc. The upper ring and lower disc are connected and separated axially by a plurality of upstanding rotor wall sections that define material outlets therebetween. The top aperture allows the material to flow downwardly into the rotor towards the lower disc, with the material then being ejected at high speed, through the material outlets between the rotor wall sections.

A replaceable distributor plate is mounted centrally on the lower disc, and is raised relative to the lower disc to facilitate the flow of material through and out of the rotor. The distributor plate also acts to protect the lower disc from the material feed. Upper and lower horizontal wear plates are fitted to the inside of the upper ring and lower disc, respectively, to guide the material outwardly, through the material outlets between the rotor wall sections.

A plurality of vertical rotor tip blocks and related cavity wear plates are arranged around the circumference of the rotor, and extend between the upper ring and lower disc. Typically, a first vertical edge of a rotor wall section is fitted with a vertical rotor tip block, the top and bottom of which are arranged proximate an extending member of the upper and lower horizontal wear plates, respectively, with the second, opposite vertical edge of a rotor wall section being fitted with a cavity wear plate. Thus, the vertical rotor tip blocks and related cavity wear plates alternate with each other around the circumference of the rotor, with a pair of spaced apart rotor tip blocks and cavity wear plates accordingly defining the material outlets between the rotor wall sections.

An upper rotor protection plate or ring is typically bolted on top of the upper ring, and is used to keep the rotor tip blocks and cavity wear plates in place.

Due to the location and nature of the rotor tip blocks, and of course the abrasive nature of the material feed, the rotor tip blocks need to be replaced relatively regularly. However, at present, the rotor tip blocks are typically securely held in place by means of the bolted rotor protection plate, and thus their replacement requires the rotor protection plate to be unbolted and removed, to allow access to the rotor tip blocks. This is a time-consuming and tedious process, and thus the aim of the present invention is to provide a rotor tip block securing arrangement that will enable the rotor tip blocks to be removed and replaced without having to unbolt the rotor protection plate.

SUMMARY OF INVENTION

According to a first aspect of the invention there is provided a rotor protection or cover plate for mounting on an upper plate of a rotor body of a crusher, in particular a vertical shaft impact crusher, the rotor protection plate comprising a body having an inner face defining a guide slot that is operably arranged to be in register with a rotor tip block opening defined on the upper plate of the rotor body and spaced apart therefrom to allow for a rotor tip block to be partly inserted into the guide slot during removal of the rotor tip block from, or insertion of the rotor tip block into, the rotor body.

In functional terms, according to the invention there is provided a rotor protection plate for a rotor body of a crusher, and in particular a VSI crusher, the rotor protection plate comprising a body having an inner face defining a guide slot that is arranged to be aligned with and face an upper end of a rotor tip block fitted to the rotor body, wherein in a default configuration, the upper end of the rotor tip block is spaced apart from the guide slot, but when in a maintenance configuration, the rotor tip block may be moved towards the inner face so as to occupy the guide slot, to facilitate the removal from the rotor body and the replacement of a new rotor tip block into the rotor body, without having to remove the rotor protection plate from the rotor body.

The guide slot may be in the form of a recess defined by a pair of outer and inner flanges and a portion of the inner face surrounded by the pair of outer and inner flanges, wherein the said portion of the inner face of the body is arranged to be spaced away from the free end of the tip block and is sized and dimensioned to allow a part of the length of the tip block to be inserted into the guide slot during insertion of the tip block into, or removal of the tip block from, the rotor body.

In another embodiment, there may be a plurality of circumferentially spaced guide slots arranged to be aligned with the tip blocks fitted to the rotor body.

The body of the protection plate may define an opening which may be located substantially centrally of the body and may be arranged to accommodate a feed eye ring of the crusher.

The body of the protector plate may be shaped as a ring having an inner periphery defining the central opening and an outer periphery in the form of the outer flange, wherein the guide slot, which may be in the form of a continuous guide recess or a plurality of circumferentially spaced guide slots, is radially spaced from the opening and extends along the circumference of the body proximate the outer periphery.

According to a second aspect of the invention, there is provided a rotor arrangement comprising:

- a rotor body comprising an upper plate and a lower plate, wherein the upper plate and lower plate each define circumferentially spaced tip block openings, wherein corresponding rotor tip block openings on the upper and lower plates are aligned so as to form an insertion passage for accommodating at least a rotor tip block therein;
- a protection or cover plate for mounting on the upper plate, the protection plate comprising a body having an inner face defining circumferentially spaced guide slots which are operably aligned with the circumferentially spaced openings or a circumferentially extending guide recess which is operably aligned with and spaced from the circumferentially spaced openings on the upper plate, wherein the guide slots or guide recess being configured to allow for a rotor tip block to be partly inserted thereinto during removal of the rotor tip block from, or insertion of the rotor tip block into, the rotor body.

In other words, according to the second aspect of the invention, there is provided a rotor arrangement comprising:

a rotor body comprising an upper ring, which defines a top aperture, and a lower disc, with a plurality of rotor wall sections extending between the upper ring and the lower disc, the rotor wall sections defining material outlets therebetween, wherein corresponding openings on the upper ring and lower disc are aligned so as to form an insertion passage for accommodating and holding a rotor tip block therein; and a protection plate for mounting on the upper ring, the protection plate comprising a body having an inner face defining a guide slot that is arranged to be aligned with and face an upper end of the rotor tip block, wherein in a default configuration, the upper end of the rotor tip block is spaced apart from the guide slot, but when in a maintenance configuration, the rotor tip block may be moved out of the opening defined in the lower disc towards the inner face so as to occupy the guide slot, with a lower end of the rotor tip block then being tilted away from the lower disc so as to clear the opening defined in the lower disc, thereby allowing the rotor tip block to be removed from the rotor body, for replacement by a new rotor tip block into the rotor body in a substantially reversed sequence, without having to remove the rotor protection plate from the rotor body.

The guide recess may be defined by an outer flange and an inner flange of the cover plate which depend downwardly from the inner face of the protection plate.

In another embodiment, wherein the inner face comprises circumferentially spaced guide slots, the protection plate may comprise a plurality of spaced apart circumferentially spaced outer and inner flanges, wherein corresponding outer and inner flanges defining the guide slots.

The body of the protection plate and upper and lower plates may be shaped as rings, and the ring of the protection plate may be larger than the upper ring of the rotor body, wherein the protection plate ring having an inner periphery defining the central opening/aperture and an outer periphery, wherein the guide slots are, or guide recess is, radially spaced from the central opening and extends along the circumference of the body proximate the outer periphery.

The rotor arrangement may comprise a second protection plate for mounting on the lower ring of the rotor body.

According to a third aspect of the invention, there is provided a rotor assembly comprising:

a rotor body comprising an upper plate and a lower plate and circumferentially spaced rotor wall sections (i.e. support members) extending between the upper plate and lower plate, wherein the upper plate and lower plate each defining circumferentially spaced rotor tip block openings, wherein corresponding openings on the upper and lower rings are aligned so as to form an insertion passage for accommodating at least a rotor tip block therein;

a protection/cover plate for mounting on the upper ring, the protection plate comprising a body having an inner face defining one of a guide recess that is operably aligned with the circumferentially spaced rotor tip block openings on the upper ring or circumferentially spaced guide slots operably aligned with the circumferentially spaced openings on the upper ring;

a plurality of radially spaced apart rotor tip blocks extending between the upper and lower plates and accommodated in the insertion passages defined by corresponding circumferentially spaced openings on the upper and lower plates, each rotor tip block having a lower end and an upper end, wherein the lower end of each rotor tip block is fitted in the corresponding rotor tip block opening in the lower plate and a cavity is defined between the upper end of each rotor tip block and the guide recess or guide slot aligned therewith, wherein in use, the rotor tip block can be allowed to be partly inserted into the guide recess or dedicated guide slot to facilitate removal thereof from the rotor body.

Typically in use, when in a default configuration, the upper end of the rotor tip block is spaced apart from the guide slot, but when in a maintenance configuration, the rotor tip block may be moved out of the opening defined in the lower plate towards the inner face so as to occupy the guide slot, with a lower end of the rotor tip block then being tilted away from the lower plate so as to clear the opening defined in the lower disc, thereby allowing the rotor tip block to be removed from the rotor body, for replacement by a new rotor tip block into the rotor body in a substantially reversed sequence, without having to remove the rotor protection plate from the rotor body.

The rotor tip block may comprise an elongate, substantially block shaped body having a first major face and an opposite second major face, a pair of opposite first and second end faces, and a pair of elongate, narrow side faces extending between the first and second major faces and end faces.

The edges of the end faces may be chamfered to allow for fitting in the recesses.

The first major face of the rotor tip block may define an elongate channel arranged to accommodate a wear insert member.

A base of the elongate channel may comprise spaced apart ridges for mating engagement with the wear insert member.

Side walls of the channel may be inclined and parallel relative to each other.

According to a fourth aspect of the invention, there is provided a rotor tip block for a rotor of a crusher, in particular a vertical shaft impact crusher, the rotor tip block comprising an elongate body having a first major face and an opposite second major face, a pair of opposite first and second end faces, and a pair of elongate, narrow side faces extending between the first and second major faces and end faces, wherein the first major face defining an elongate channel for accommodating a wear insert member, and wherein the edges of at least one of the end faces are chamfered.

Two diagonally opposite edges of each end face may be chamfered to an angle that is at least 5 degrees relative to the vertical and the other two diagonally opposite edges may be chamfered to an angle that is at least 45 degrees relative to the vertical.

A base of the elongate channel may comprise spaced apart ridges.

Side walls of the channel may be inclined and parallel relative to each other.

According to a fifth aspect of the invention, there is provided a computer-readable medium storing instructions which, when executed by a processor, is arranged to cause a 3D printer to print/manufacture a rotor tip block, or a protection plate as hereinbefore defined.

According to a sixth aspect of the invention, there is provided a method of printing an article including at least one of a rotor tip block and a protection plate as hereinbefore defined, the method comprising processing (e.g. 3D scanning) the article into forming a digital file thereof, the digital file comprising instructions which are arranged to control a 3D printer to print out the article, in use.

The method may further include the step of storing the digital file on a memory device or on a physical or digital (i.e. storage pool) storage location.

The method may further include downloading the digital file onto the 3D printer, in use to allow the digital file to control the operation of the 3D printer into printing out the article.

The method may further include transferring the digital file to the 3D printer, in use to allow the digital file to control the operation of the 3D printer into printing out the article.

According to a seventh aspect of the invention, there is provided a method of printing an article including at least one of rotor tip block and a protection plate as hereinbefore defined, the method comprising storing a digital file thereof, the digital file comprising instructions which are arranged to control a 3D printer to print out the article, in use.

The rotor tip blocks of the present invention may be cast, wrought machined from any grade of suitable steel to securely hold carbide impact plates in situ.

BRIEF DESCRIPTION OF DRAWINGS

The objects of this invention and the manner of obtaining them, will become more apparent, and the invention itself will be better understood, by reference to the following description of embodiments of the invention taken in conjunction with the accompanying diagrammatic drawings, wherein.

DETAILED DESCRIPTION OF AN EXAMPLE EMBODIMENT

Figure 1:
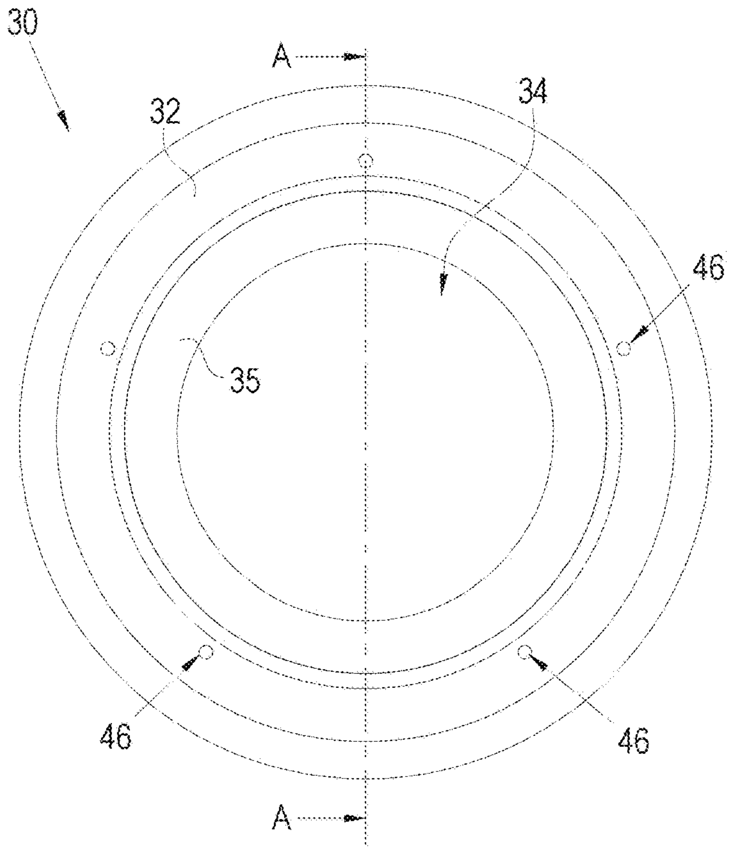
FIG. 1 shows a rotor protection plate for mounting on a rotor body of a crusher in accordance with the invention.
Figure 2:
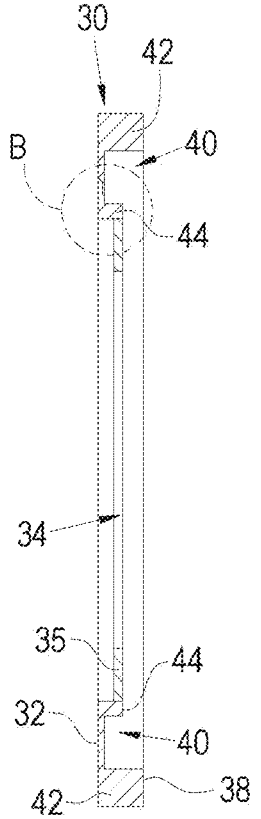
FIG. 2 shows a cross sectional view of the rotor protection plate taken along line A-A.
Figure 3:
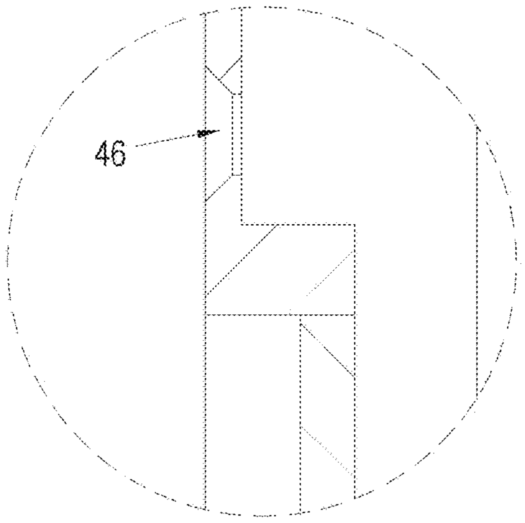
FIG. 3 shows a detail view B of FIG. 2.

The following description of the invention is provided as an enabling teaching of the invention. Those skilled in the relevant art will recognise that many changes can be made to the embodiment described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention. Thus, the following description is provided as illustrative of the principles of the present invention and not a limitation thereof.

As can be seen in FIGS. 7 to 12 of the drawings, there is provided a rotor assembly designated generally by reference numeral 10. The rotor assembly 10 comprises a rotor tip block securing arrangement 12 comprising of a rotor arrangement comprising a rotor body 14 and an upper rotor protection plate 30 as will be described in more detail below.

Figure 6:
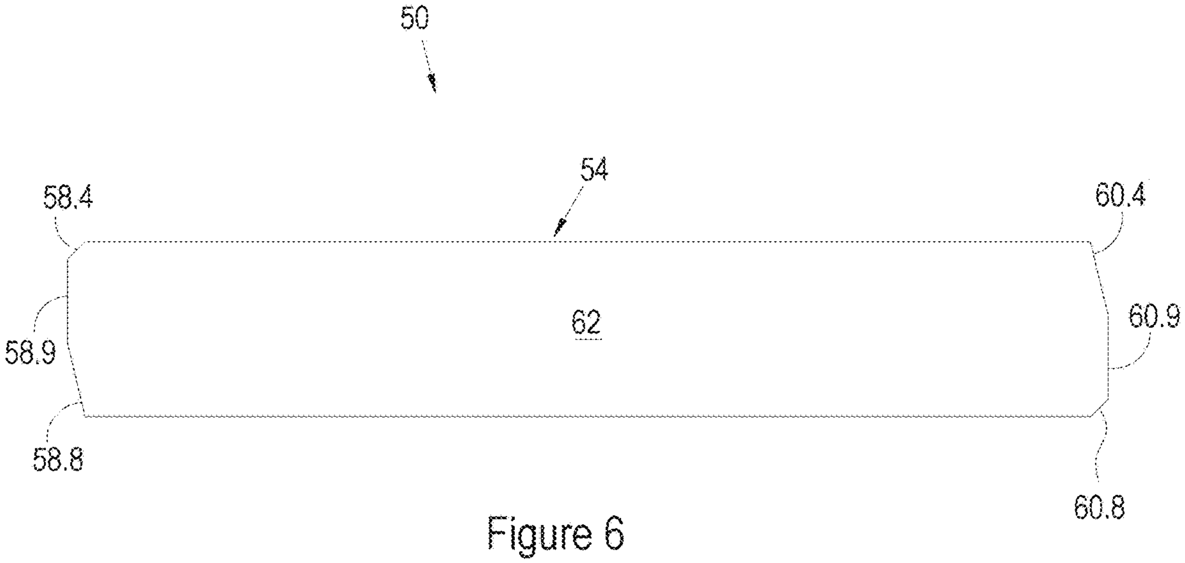
FIG. 6 shows a side view of the rotor tip block of FIGS. 4 and 5.

The rotor body 14 comprises of a horizontally arranged upper plate in the form of an upper ring 16 and a horizontally arranged lower plate 18 in the form of a lower disc which are axially spaced apart by a plurality of rotor wall sections (i.e. support members) 20 extending around the circumference of the rotor body 14. Neighbouring rotor wall sections 20 each define an outlet opening 26 through which material from the rotor body 14 can be ejected for impact contact with an outer wall (not shown) of a crusher (not shown). Each of the upper ring 16 and lower disc 18 define circumferentially spaced rotor tip block openings 22, 24 where corresponding rotor tip block openings 22 on the upper ring 16 are arranged to be aligned with corresponding rotor tip block openings 24 on the lower disc 18, where corresponding aligned rotor tip block openings on the upper ring 16 and lower disc 18 define an insertion passage 28 for either a rotor tip block 50 or a cavity wear plate 80 which are arranged to be inserted in the insertion passage in an alternating sequence and positioned relative to the vertical side edges 20.2. and 20.4 of a shared rotor wall section 20 respectively (i.e. each of the rotor tip block 50 and wear cavity plate 80 is arranged on the sides of a shared rotor wall section 20). As can be seen in FIG. 6, a pair of neighbouring cavity wear plates 80 and rotor tip blocks 50 fitted relative to neighbouring rotor wall sections 20 further define the outlet openings 26.

As mentioned above, the rotor assembly 10 comprises the upper rotor protection plate 30 comprising an outer protection ring body 32 and an inner protection ring body 35 that is stepped downwardly from the outer protection ring body 32 and defines a central aperture 34, as shown in FIGS. 1 to 3 and 7 to 12.

The protection plate 30 comprises an outer face 36 and an inner face 38. The inner face 38 has a circumferentially extending guide recess 40 that is radially spaced from the central aperture 34 and positioned proximate an outer periphery of the protection plate 30. The protection plate 30 further comprises an outer flange 42 and an inner flange 44 which define the guide recess 40. The protection plate 30 defines radially spaced, circumferentially arranged counter sink holes 46 which are arranged to allow for the securing of the protection plate 30 on corresponding openings 17 of the upper ring 16, as will be described below. The protection plate 30 is operably arranged on the upper ring 16 such that the guide recess 40 is aligned with the rotor tip block openings 22 on the upper ring 16, as shown more clearly in FIGS. 8 to 12.

It will be appreciated that albeit a continuous guide recess 40 is shown in FIGS. 1 to 3 and 7 to 12, it is envisaged that the guide recess may comprise a plurality of circumferentially spaced guide slots, each guide slot being arranged to be aligned with (and dedicated for) a corresponding rotor tip block opening 22 on the upper ring 16.

The rotor assembly 10 further comprises a lower protection plate 48 which is arranged to be mounted onto the lower disc 18 for engaging with the lower ends of rotor tip blocks inserted through the lower tip block openings 24 defined on the lower disc 18.

As mentioned also above, the rotor assembly 10 comprises a rotor tip block 50, as shown in FIGS. 4 to 12 comprising an elongate, substantially block shaped body 52 having a first major face 54 and an opposite second major face 56, a pair of opposite first and second end faces 58, 60, and a pair of elongate, narrow side faces 62, 64 extending between the first and second major faces 52, 54 and end faces 58, 60.

Figure 4:
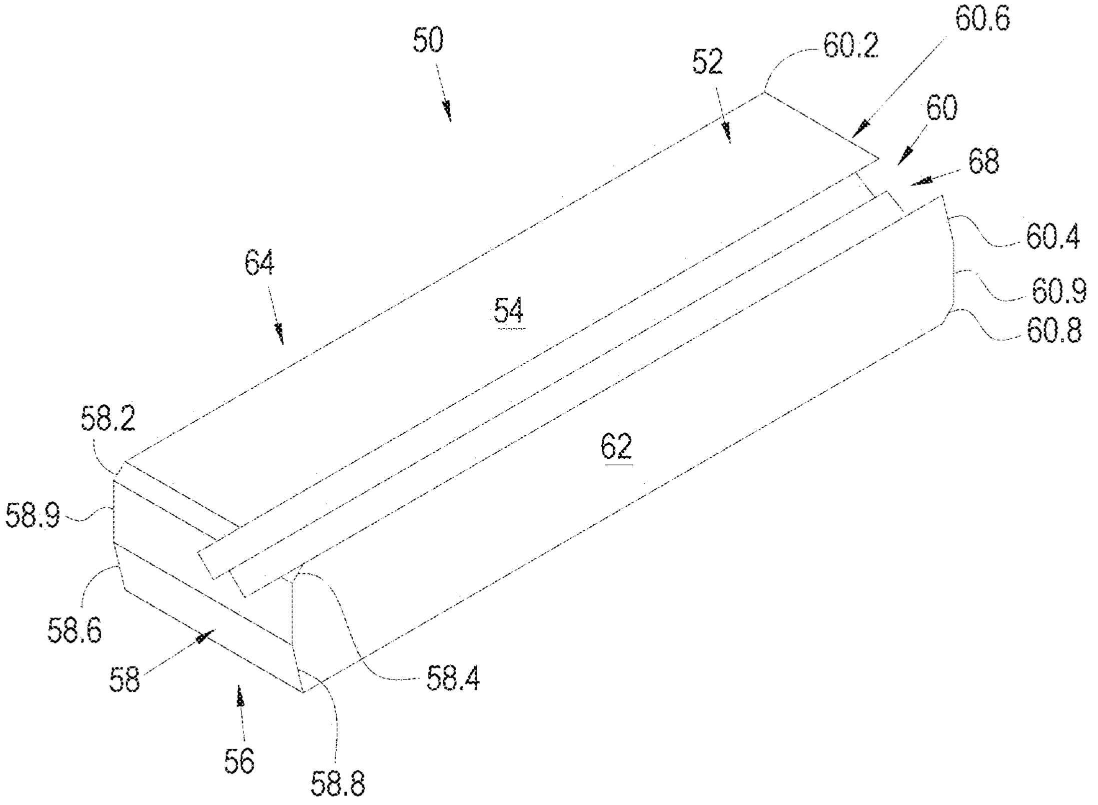
FIG. 4 shows a perspective view of a rotor tip block in accordance with the invention.
Figure 5:
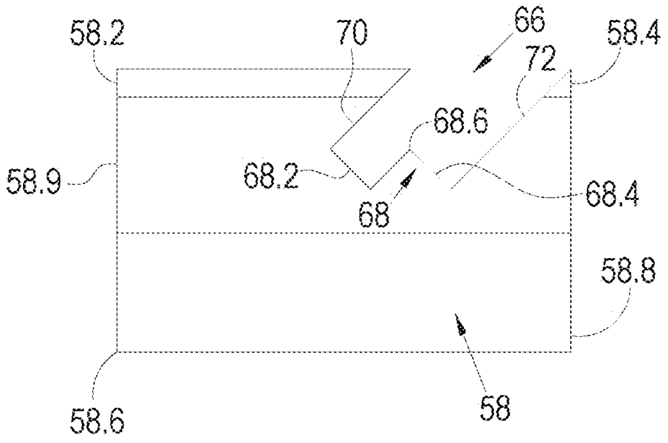
FIG. 5 shows a first end view of the rotor tip block of FIG. 4.

The edges 58.2, 58.4, 58.6, 58.8, 60.2, 60.4, 60.6, 60.8 of the end faces 58, 60 of the rotor tip block 50 are chamfered to allow for guided fitting in the guide recess 40 of the protection plate 30. Two diagonally opposite edges 58. and 60.8 of the first end face 58 and second end face 60 respectively along the first narrow side face 62, and 58.2 and 60.6 of the first end face 58 and second end face 60, respectively along the second narrow side face 64, may be chamfered to an angle that is at least 45 degrees relative to the vertical, and the other two diagonally opposite edges 58.6 and 60.2 along the second narrow side face 64 and 58.8 and 60.4 along the first narrow side face 62 may be chamfered at an angle that is at least 5 degrees relative to the vertical, as can be seen in FIGS. 4 and 5 and more clearly in FIG. 6. The edges which are chamfered up to 5 degrees relative to the vertical may be longer than the edges chamfered up to 45 degrees relative to the vertical, and therefore the longer edges 58.6 and 58.8 of the first end face 58 and 60.2 and 60.4 of the second end face 60 occupy a major portion of each respective end face 58 and 60, and the minor edges 58.2 and 58.4 of the first end face 58 and 60.6 and 60.8 of the second end face 60 occupy a minor portion of each respective end face 58 and 60, and a substantially straight/upstanding edge portion 50.9 and 60.9 extends between the longer and shorter edges of the first and second end faces 58 and 60, respectively, as shown more clearly in FIG. 6.

The first major face 54 of the rotor tip block 50 defines an elongate channel 66 that is arranged to accommodate a wear insert member 90, in the form of a carbide impact plate, in situ therein. A base 68 of the elongate channel 66 comprises spaced apart, angularly arranged ridge floors 68.2, 68.4 having a common upper ridge 68.6 for mating engagement with a complimentary mating surface (not shown) of the wear insert member 90. Side walls 70, 72 of the channel 66 are inclined at an angle of about 45 degrees relative to the vertical and are arranged parallel relative to each other.

As can be seen in FIGS. 7 to 11, the rotor assembly 10 further comprises horizontally arranged upper wear plates 74 and lower wear plates 76 fitted on the inner side of the upper ring 16 and the lower disc, respectively, which wear plates 74,76 extend partly into the rotor wall sections 20 to guide material through the ejection openings 26. The rotor assembly further comprises a substantially dome shaped distributed plate 95 mounted centrally of the rotor body 12 on the lower disc 18 and raised relative to the lower disc 18.

Figure 7:
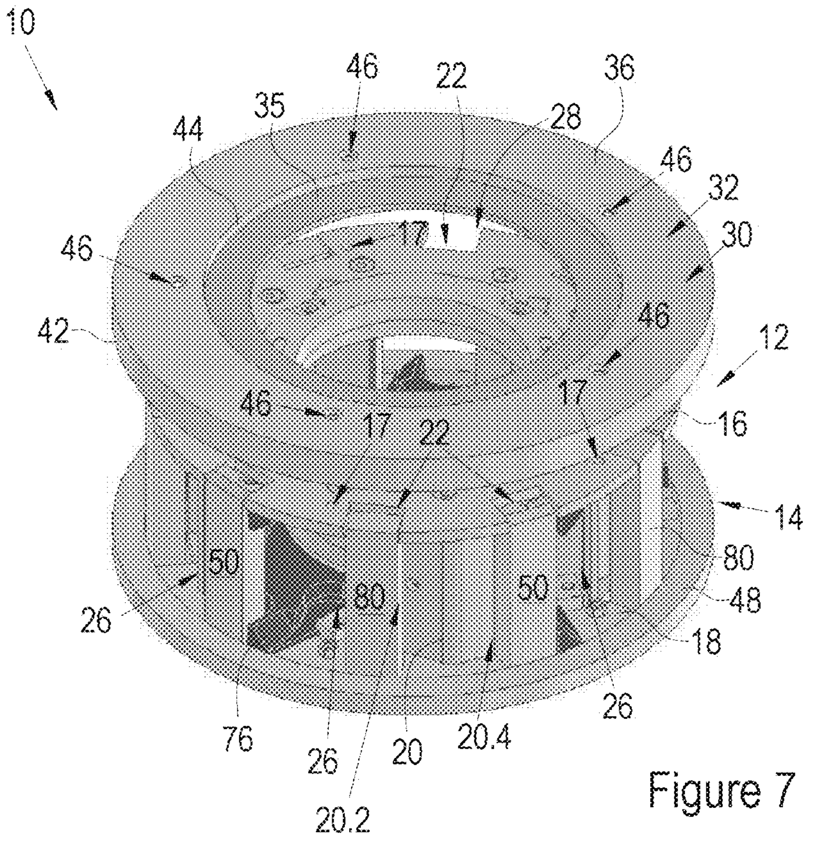
FIG. 7 shows a rotor tip block securing arrangement in accordance with the invention with the rotor protection plate of FIGS. 1 to 3 shown lifted upwardly away from the rotor body.

In use, a plurality of vertically arranged (i.e. upstanding) rotor tip blocks 50 and cavity wear plates 80 are inserted in an alternating sequence in the insertion passages 28 in a soldier type orientation (i.e. with the narrow side faces 62, 64 facing sidewardly) and with the channel 66 of each rotor tip block 50 facing inwardly. When each rotor tip block 50 is arranged in the soldier type orientation as mentioned herein and shown in FIGS. 7 to 8 of the drawings, the lower end face 60 of each rotor tip block 50 is inserted into the lower rotor tip block opening 24 on the lower disc 18 and engages the lower protection plate 48, and the upper end face 58 of each rotor tip block 50 is aligned with the upper ring 16 and accommodated in the upper rotor tip block opening 22 of the upper ring 16, as shown in FIG. 7.

Figure 9:
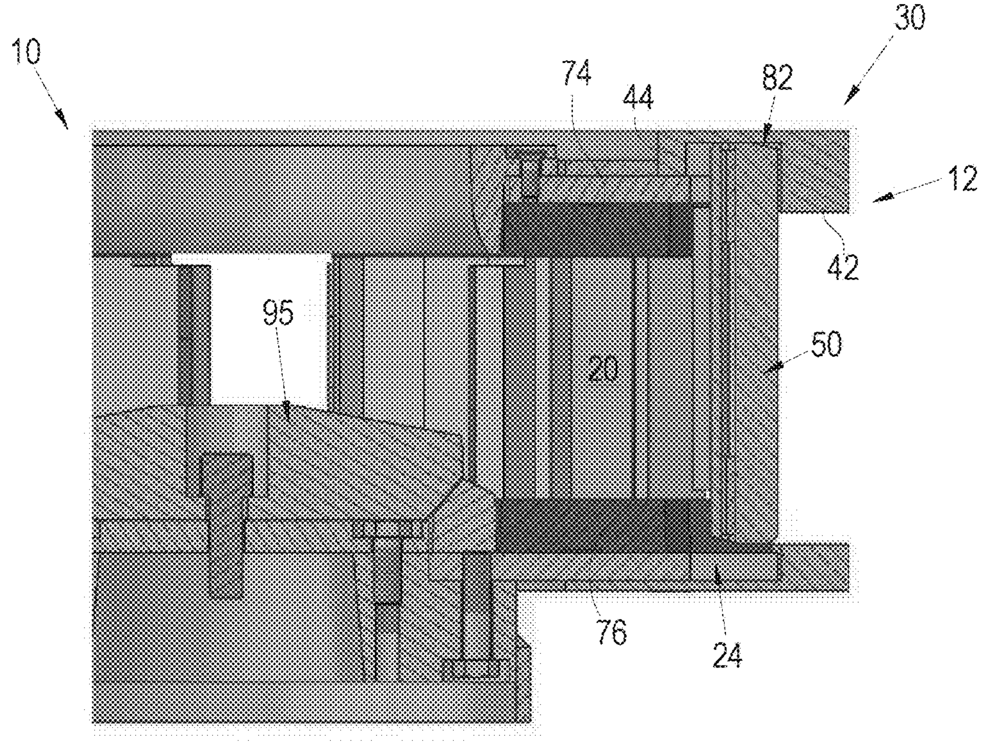
FIG. 9 shows a cross-sectional view of the rotor tip securing arrangement in a maintenance configuration, wherein the rotor tip block is lifted from a lower disc of the rotor body and partly inserted into a recess defined by the rotor protection plate of FIGS. 1 to 3.

Once the rotor tip blocks 50 are inserted in the insertion passages 28 in an alternating sequence with the wear cavity plates 80 as described hereinabove, the rotor protection plate 30 is mounted onto the upper ring 16 and secured thereto by bolting in the counter sink holes 46 arranged in register with respective openings 17 on the upper ring 16, and arranged in such a way that the guide recess 40 is aligned with the upper rotor tip block openings 22 on the upper ring 16 and such that the guide recess 40 thereof is vertically spaced apart from the upper rotor tip block openings 22 such that a cavity/space 82 is formed between the upper end face 58 of each rotor tip block 50 and the guide recess 40. When a rotor tip block 50 is required to be removed from the rotor tip securing arrangement 12, the rotor tip block 50 is first lifted upwardly such that the lower end face 60 is cleared from the lower rotor tip block opening 24 defined in the lower disc 18 and the upper end face 58 thereof is inserted into the guide recess 40, with the chamfered edges 58.2, 58.4, 58.6, 58.8 of the upper end face 58 allowing for the upper end face 58 to engage the guide recess 40, as shown in FIG. 9.

Figure 10:
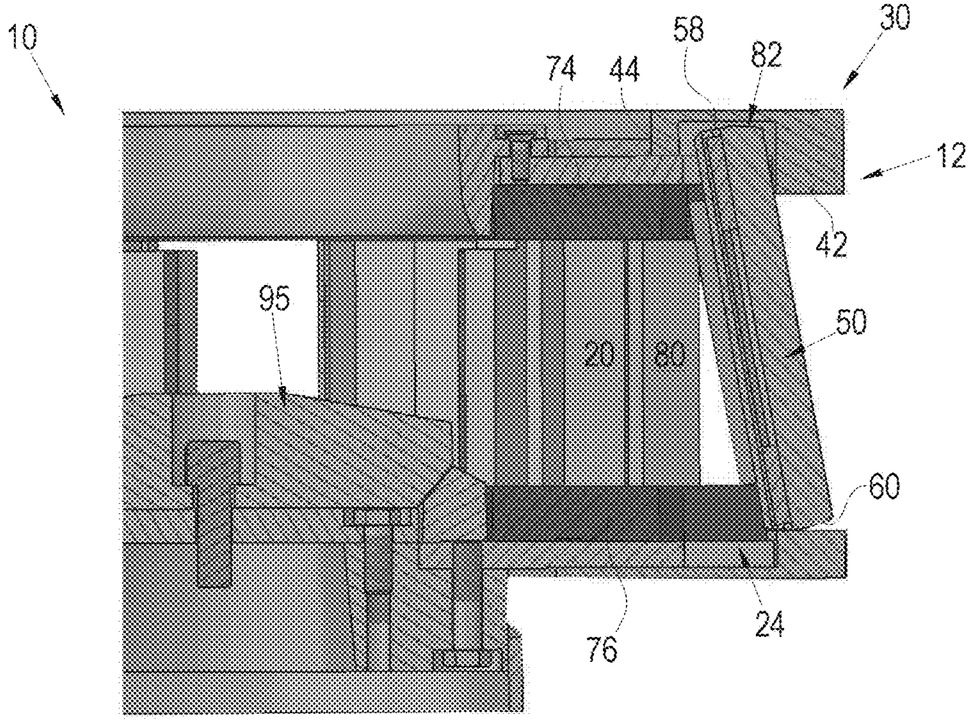
FIG. 10 shows a cross-sectional view of the rotor tip securing arrangement of FIG. 9 still in the maintenance configuration, however the rotor tip block is tilted relative to the rotor protection plate.
Figure 11:
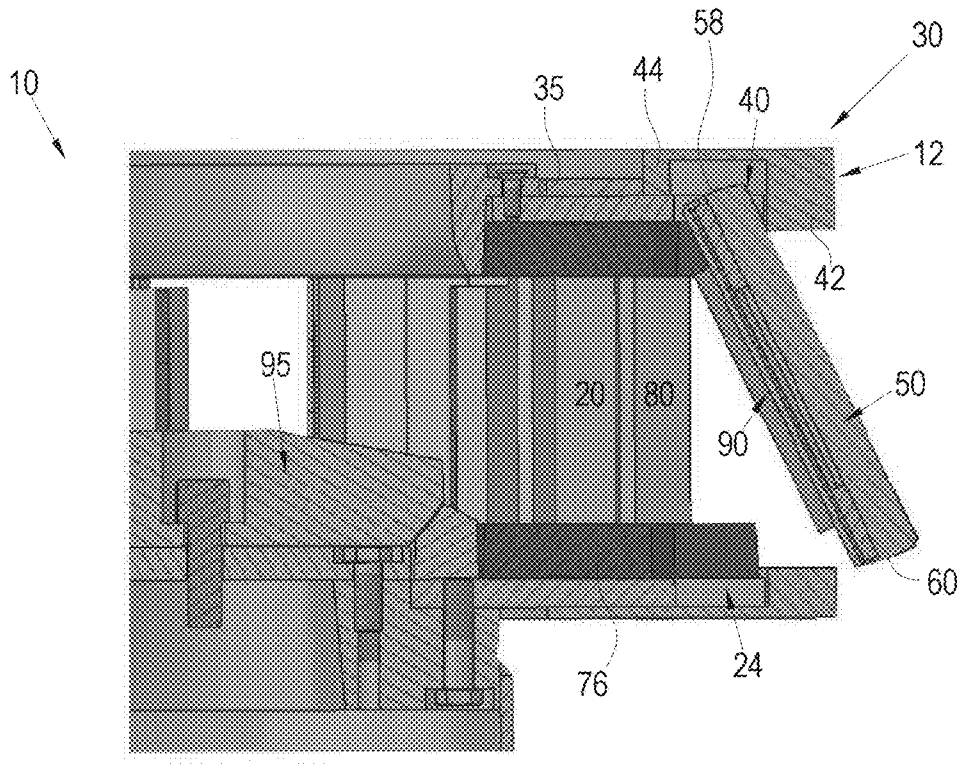
FIG. 11 shows the rotor tip block in a configuration allowing for its removal from the rotor tip securing arrangement.

Once the rotor tip block 50 is in this configuration (i.e. maintenance configuration), the rotor tip block 50 may be tilted relative to the upper protection plate 30 and lower protection plate 48, with the chamfered edges on the upper end face 58 allowing for the upper end face 58 to tilt and slide relative to the guide recess 40 and the outer and inner flanges 42 and 44 thereof, as shown in FIG. 10. When the rotor tip block 50 has been tilted sufficiently within the guide recess 40 such that no further tilting can be allowed, the rotor tip block 50 may be removed from the rotor tip block securing arrangement 12 by slidably pulling out the rotor tip block 50 via the lower end face 60 thereof followed by the withdrawal of the upper end face 58 out of the guide recess 40, through the upper rotor tip block opening 22 on the upper ring 16 and ultimately removal of the rotor tip block 50 from the rotor securing tip arrangement 12, as shown in FIGS. 11 and 12.

Figure 8:
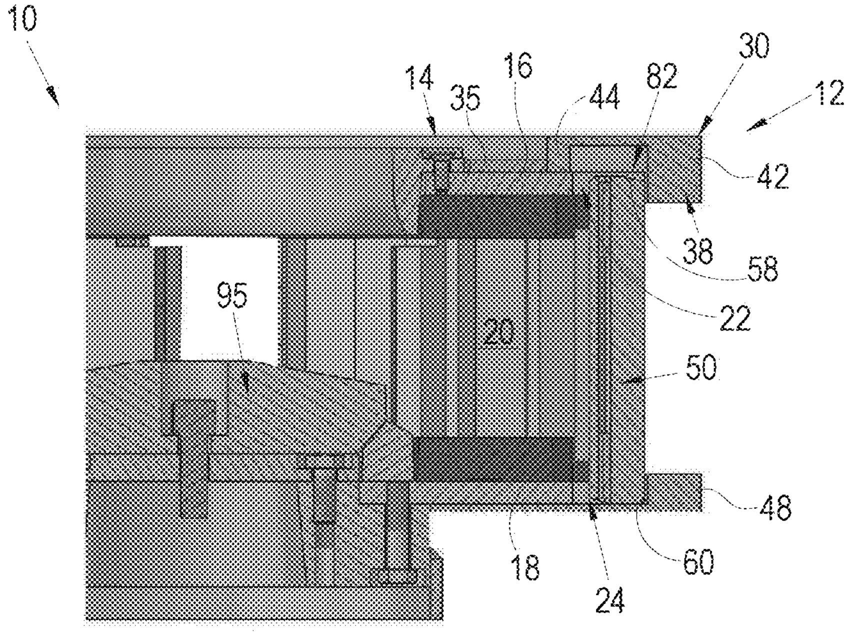
FIG. 8 shows a part cross-sectional view of a rotor assembly in accordance with the invention and a rotor tip securing arrangement in a default/operation configuration with the rotor tip block of FIGS. 4 to 6 arranged in an upright configuration between an upper ring and lower disc of the rotor body.
Figure 12:
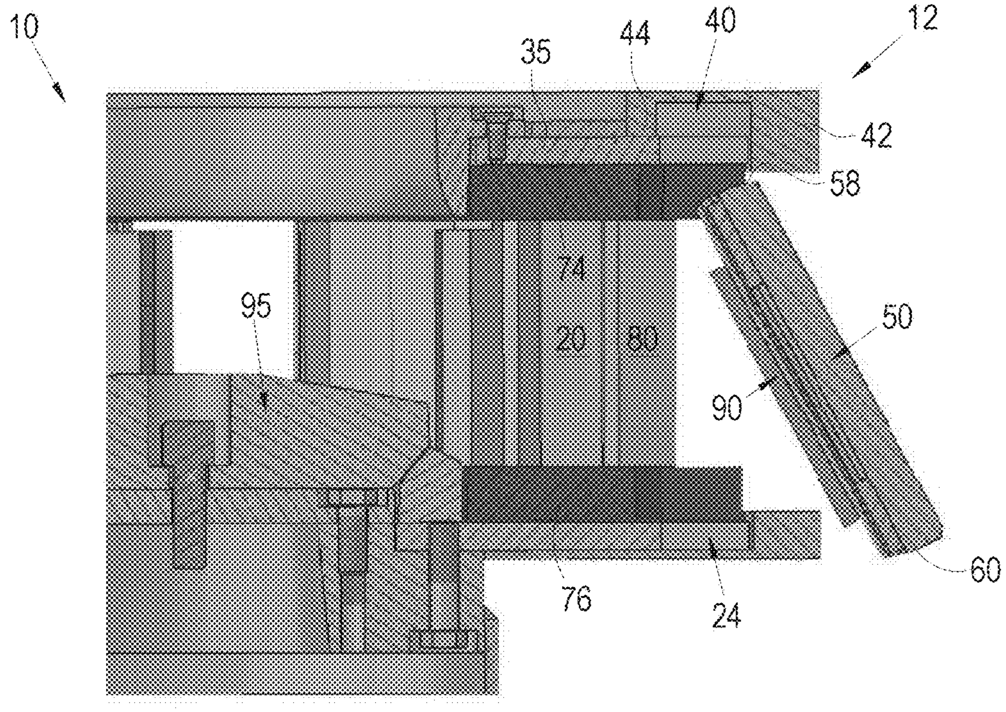
FIG. 12 shows the rotor tip block which was fitted to the rotor assembly completely removed from the rotor assembly.

When a new rotor tip block 50 is required to be fitted into the rotor assembly 10 or rotor tip securing arrangement 12, the upper rotor protection plate 30 is not required to be removed or unsecured from the upper ring 16, but the new rotor tip block 50 may be inserted into the rotor securing tip arrangement 12 in a reverse sequence followed in the order of FIG. 12 to FIG. 8. In other words, the new rotor tip block 50 may be inserted in the rotor tip securing arrangement 12 by inserting the upper end face 58 thereof in a tilted configuration into the rotor tip block opening 22 of the upper ring 16 and into the guide recess 40, as shown in reverse sequence in FIGS. 11 and 10, followed by arranging the rotor tip block 50 in substantially an upright configuration, as shown in FIG. 9, to allow for the new rotor tip block 50 to be released into the insertion passage 28 to allow the lower end face 60 thereof to be received into the lower tip block opening 24 defined by the lower disc 18 and engage with the lower protection plate 48.

The Applicant believes that the rotor tip securing arrangement 12 and rotor assembly 10 as described above will simplify the process of exchanging worn out rotor tip blocks with new rotor tip blocks, which will in turn decrease maintenance downtime.

It will be appreciated that the upper protection plate 30 and rotor tip block 50 described herein could be manufactured by, for example, additive manufacturing, in particular 3D printing. Each of the protection plate 30 and rotor tip block 50 may be scanned thereby creating a digital blueprint of the article (i.e. rotor tip block 50 or protection plate 30) and the digital blueprint of the article may be digitally coupled with machine-readable instructions which can be stored in a storage pool, and ultimately the machine-readable instructions incorporating the blueprint of the article can be uploaded/downloaded onto a 3D printer to cause the 3D printer to print out the article.

While the invention has been described in detail with respect to a specific embodiment and/or example thereof, it will be appreciated that those skilled in the art, upon attaining an understanding of the foregoing may readily conceive of alterations to, variations of and equivalents to these embodiments. Accordingly, the scope of the present invention should be assessed as that of the claims and any equivalents thereto, which claims shall be appended hereto upon completion of this patent application.

The invention claimed is:

1. A rotor arrangement comprising:

a rotor body comprising an upper plate and a lower plate, wherein the upper plate and the lower plate each define circumferentially spaced rotor tip block openings, and wherein the circumferentially spaced rotor tip block openings defined by the upper plate and the circumferentially spaced rotor tip block openings defined by the lower plate are aligned so as to form an insertion passage for accommodating at least a rotor tip block therein; and a protection plate for mounting on the upper plate, the protection plate comprising a body having an inner face defining a circumferentially extending guide recess, wherein the guide recess is operably aligned with and spaced from the circumferentially spaced rotor tip block openings defined by the upper plate, with the guide recess being configured to allow for the rotor tip block to be partly inserted thereinto during removal of the rotor tip block from, or insertion of the rotor tip block into, the rotor body.

2. The rotor arrangement of claim 1, wherein the upper plate of the rotor body comprises an upper ring which defines the circumferentially spaced rotor tip block openings defined by the upper plate, and the lower plate of the rotor body comprises a lower disc which defines the circumferentially spaced rotor tip block openings defined by the lower plate, with a plurality of rotor wall sections extending between the upper ring and the lower disc, the rotor wall sections defining material outlets therebetween.

3. The rotor arrangement of claim 2, wherein the protection plate is arranged to be mounted on the upper ring, with the guide recess being aligned with an upper end of the rotor tip block, wherein in a default configuration, the upper end of the rotor tip block is spaced apart from the guide recess, but when in a maintenance configuration, the rotor tip block is capable to be moved out of a first rotor tip block opening of the circumferentially spaced rotor tip block openings defined by the lower disc towards the inner face of the protection plate so as to occupy the guide recess, with a lower end of the rotor tip block then being tilted away from the lower disc so as to clear the first rotor tip block opening defined in the lower disc, thereby allowing the rotor tip block to be removed from the rotor body, for replacement by a new rotor tip block into the rotor body in a substantially reversed sequence, without having to remove the protection plate from the rotor body.

4. The rotor arrangement of claim 3, wherein the rotor arrangement comprises a second protection plate for mounting on the lower disc of the rotor body.

5. The rotor arrangement of claim 1, wherein the guide recess is defined by an outer flange and an inner flange of the protection plate, with the outer flange and the inner flange extending from the inner face of the protection plate.

* * * * *